Feb. 27, 1951 A. C. EVERETT 2,543,280
APPARATUS FOR HANDLING CONTAINERS
Filed April 26, 1946 5 Sheets-Sheet 2

Fig. 2.

INVENTOR.
Arthur Clarence Everett
BY J. Stanley Churchill
ATTORNEY

Feb. 27, 1951 A. C. EVERETT 2,543,280
APPARATUS FOR HANDLING CONTAINERS
Filed April 26, 1946 5 Sheets-Sheet 5

INVENTOR.
Arthur Clarence Everett
BY
J. Stanley Churchill
ATTORNEY

Patented Feb. 27, 1951

2,543,280

UNITED STATES PATENT OFFICE 2,543,280

APPARATUS FOR HANDLING CONTAINERS

Arthur Clarence Everett, Boston, Mass., assignor to Pneumatic Scale Corporation, Limited, Quincy, Mass., a corporation of Massachusetts Application April 26, 1946, Serial No. 665,243

7 Claims. (Cl. 226—68)

This invention relates to a container handling machine which is particularly useful, among other purposes, for producing filled and closed containers and for performing thereon one or more additional operations such as will be hereinafter more fully described.

The primary object of the invention is to produce a container handling machine which is adapted to successively present successive containers to successive mechanisms of the machine adapted to perform successive operations upon the containers and which is capable of operation at relatively high speeds with minimum noise, breakage and contact of the containers one with the other.

A further and more specific object of the invention is to provide novel apparatus for effecting the pneumatic cleaning, the filling, the closing and the labeling of containers in such manner that these operations may be performed at relatively high speeds with minimum contact of the containers one with the other so that when fragile containers, such as bottles, are being handled excessive noise and breakage is reduced to a minimum.

Still further, a more specific object of the invention is to provide novel apparatus for pneumatically cleaning, filling and capping containers wherein provision is made for positively controlling the movement of the bottle or container during the passage thereof through the entire apparatus and until it has been discharged, after having been capped, to the end that bottles or containers may be maintained in spaced relation during their entire progress through the machine eliminating excessive noise and breakage. A still further object of the invention is to provide a novel method of producing filled and closed containers and particularly bottles, by which the same may be produced in an efficient and practical manner.

With these objects in view, and such others as may hereinafter appear, the invention consists in the container handling apparatus and in the various structures, arrangements and combinations of parts hereinafter described and particularly defined in the claims at the end of this specification.

In the drawings illustrating the preferred embodiment of the invention, Fig. 7 is a cross sectional view taken on the line 7—7 of Fig. 3; and Fig. 8 is a plan view detail in cross section taken on the line 8—8 of Fig. 7 to be referred to.

In handling certain types of containers, particularly glass bottles and other fragile containers, considerable difficulty has heretofore been experienced during the handling of the bottles, and the passage thereof through the several mechanisms by which the bottles have been cleaned, filled, capped, labeled and other various operations which are performed thereon. When, as in commercial practice, successive separate machines have been connected together to perform a continuous production line, by belt or by other conveyers interposed between the various mechanisms for performing the several operations upon the containers or bottles, experience has demonstrated that a substantial amount of breakage occurs by reason of the contact of one bottle with another resulting not only in loss of containers and loss of production time but also in the loss of the contents of the containers. In passing from one mechanism to a succeeding mechanism oftentimes the interposed belt or other conveyer is of substantial length, sometimes many feet in length, and during the passage of the bottles on the conveyer slippage occurs, and also unintentional displacement of the bottles from their predetermined positions at which they enter the conveyer so that as a practical matter it has been necessary to equip such a production line with individual container controlling mechanisms for controlling the spacing and introduction of the bottles into each mechanism at the required time in the attempt to eliminate breakage of the bottles. The next attempt to avoid the necessity of individual bottle controlling mechanisms, and to reduce to a minimum the noise and breakage incident to collision between the bottles, comprised synchronization of the individual conveyers which were employed between the various mechanisms. While this reduced, to some extent, the noise and breakage incident to collision of the bottles upon the conveyers, nevertheless, because of the slippage of the bottles upon the conveyers, and the liability of accidental and unintentional displacements of the bottles from their predetermined positions on the conveyer, the problem has not been completely solved.

The aim of the present invention is to provide a container handling machine comprising a production line involving a plurality of separate mechanisms for performing successive operations upon the containers and in which the bottles or containers are positively controlled during their conveyance through the several mechanisms and maintaining spaced relation. In practice, the invention contemplates a plurality of individual mechanisms for performing successive operations upon the container with a conveying system for conveying containers to and through successive mechanisms, said conveying system embodying a positively driven member from which the several instrumentalities in one group are positively driven in accurately timed relation to one another. Provision is made for driving a plurality of mechanisms constituting a second group in the production line from said driven member and in accurately timed relation thereto. The two groups are preferably connected by a conveyer, and the latter constitutes a reservoir within which the containers or bottles from the first group may collect to enable the operator to introduce, inspect, or replace bottles at this point in their travel through the production line for reasons which will be more fully hereinafter explained.

After the containers or bottles are thus conveyed by this intermediate conveyer into a position where they are about to enter the second group, provision is made for accurately timing the introduction of the bottles therein, as will be described. Provision is also preferably made for enabling the two groups of mechanisms to be operated at different speeds with relation to one another as well as at the same speed.

Figure 1:
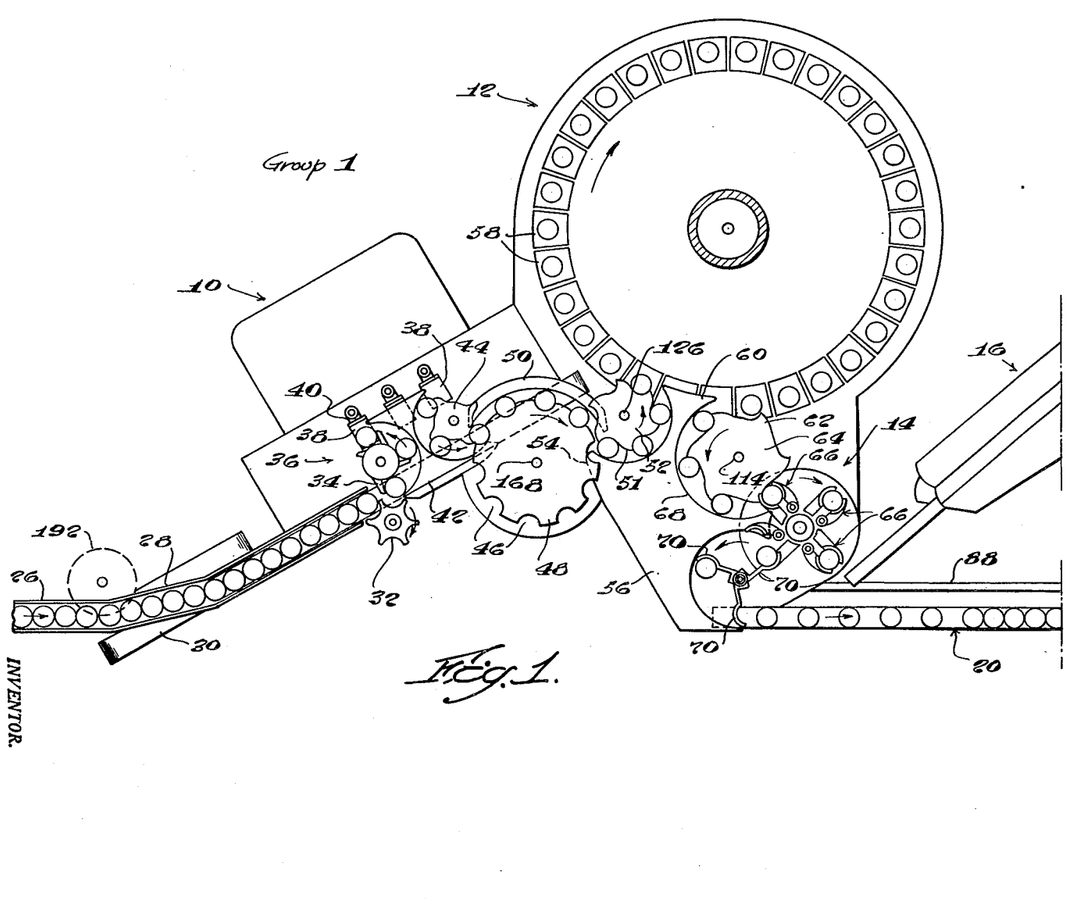
Fig. 1 is a plan view of one portion of the container handling apparatus embodying the present invention.

Referring now to the drawings, in general, the illustrated container handling apparatus includes a group of machines or mechanisms, illustrated in Fig. 1 as comprising container cleaning mechanism, indicated generally at 10, container filling mechanism, indicated generally at 12, and container closing or capping mechanism indicated generally at 14 which latter includes cap feeding mechanism 16 for supplying closures to the capping mechanism, such group of mechanisms being connected by common driving mechanism and being hereinafter referred to as Group 1. The mechanisms illustrated in Fig. 2 comprise a labeling machine indicated generally at 18 which is connected to the machines of Group 1 by a continuously moving conveyer 20 and through connections from the main driving mechanism, indicated generally at 22 in Fig. 2. The labeling machine may and preferably will be connected by a conveyer 24 to one or more other machines, for performing subsequent operations upon the containers, such as a machine indicated generally at 23, see Fig. 2A, which may comprise a bottle banding machine for applying a wet regenerated cellulose sealing band about the closure and neck of the bottle or other container, whereupon the containers may be packed for shipment. The labeling machine and such subsequent machines may and preferably will be connected by common driving mechanism and will form a second group of machines which may be hereinafter referred to as Group 2. Both groups of machines are in accordance with the invention driven through connections from the main driving mechanism 22 to be hereinafter more fully described.

In general, in the operation of the present container handling apparatus, the containers, such as bottles, are moved continuously and at relatively high speed through the various mechanisms comprising Group 1, and, in accordance with one feature of the present invention provision is made for positively controlling the movement of the bottles in accurately spaced relation through the various mechanisms and while being conveyed or transferred from one mechanism to another to the end that the bottles are maintained in predetermined relation and out of contact with one another at all times during the continuous passage thereof to and through the mechanisms. In such machines or mechanisms the spaced relation of the bottles or pitch distances from the center of one bottle to the next may vary in the different machines in accordance with the general design of the individual machine, the size of the bottles, the number of operating units provided, and other factors, and, accordingly the present apparatus is provided with conveying or transfer mechanisms disposed between the various mechanisms adapted to receive the bottles being discharged in a definite spaced relation from one machine and to deliver the bottles to the next machine at the same spaced relation or at a predetermined and different spaced relation or pitch distance to accommodate the spacing to that of such machine, as will be hereinafter more fully described.

As herein shown, the bottles are introduced into the apparatus from a continuously driven supply conveyer 26 and are guided by rails 28 onto a continuously moving incoming conveyer 30 on which the bottles are disposed in contiguous relation. In operation, the foremost bottle in the line is engaged by a continuously driven rotary star wheel 32 provided with a plurality of equally spaced teeth arranged to enter between successive bottles as they are delivered and to release such bottles in timed relation to the operation of the bottle cleaning machine. The bottles thus released are presented into the path of arms 34 of a rotary feeding device indicated generally at 36 which operates to transfer successive bottles onto the platforms 38 of successive supporting brackets 40 forming a part of the container cleaning machine, the bottles being guided onto the platforms by a guide rail or plate 42, as shown.

The container cleaning machine, herein diagrammatically illustrated, may and preferably will comprise a pneumatic cleaning machine of the type illustrated and described in the United States Patent No. 2,354,308 issued to A. C. Everett, July 25, 1944, to which reference may be had for a more complete disclosure of the machine and the mode of operation thereof. Accordingly, only sufficient portions of such machine are herein illustrated and described as will enable the present invention to be understood.

In general, in such cleaning machines provision is made for presenting successive containers in radial alignment with individual cleaning nozzles on a rotatable supporting member or carrier by which the containers are rotated into an inverted position. During the progress of the containers into and from an inverted position provision is made for injecting a stream of air into the interior of the container to effect discharge of foreign particles through the mouth of the container.

Upon being cleaned the bottles are removed from the platforms 38 as they arrive at the discharge station by the engagement of the bottle with an extended portion of the guide rail 42 and successive bottles thus removed are transferred by a rotary toothed wheel 44 into successive equally spaced arcuate pockets or cutouts 46 of a rotary transfer member 48. The transfer member 48 is continuously driven in a clockwise direction viewing Fig. 1 and in timed relation to the discharge of the bottles from the cleaning machine and is arranged to cooperate with a stationary guide rail 50 to guide and convey the bottles into the path of successive arms 51 of a rotary intake spider 52 arranged to be rotated in a counterclockwise direction in timed relation to the operation of the filling machine 12. As shown in Fig. 1, the bottles are guided out of the pockets 46 by an extended portion 54 of a guide rail or plate 56 at which time they are picked up by successive teeth of the intake spider and disposed upon successive continuously moving elevating platforms 58 forming a part of the bottle filling machine 12.

The bottle filling machine as herein diagrammatically illustrated, may and preferably will comprise a rotary vacuum filling machine of the type illustrated and described in the United States Patent to A. C. Everett, No. 2,136,421, issued November 15, 1936, to which reference may be had for a more complete description of the construction and mode of operation of such filling machines, only sufficient portions thereof being herein illustrated and described as will enable the present invention to be understood. In general, such filling machines are provided with a plurality of filling heads arranged to fill the bottles during continuous movement of the filling heads and the bottles as they are supported upon the continuously rotating bottle supporting and elevating platforms 58, the filling operation being effected by the evacuation of the bottle when the latter is elevated into engagement with a filling head in accordance with the well known vacuum principle.

From the description thus far it will be observed that the bottles are positively controlled and maintained in spaced relation during their conveyance through the bottle cleaning machine and the bottle filling machine and during their transfer from one machine to the other. In the illustrated embodiment of the invention, the container cleaning machine is arranged to discharge the bottles at a rate such as to space the bottles at substantially the same spacing as they are received by the filling machine, that is, for example, at a spacing of approximately six inches apart, the transfer members 48 and 52 being designed to maintain such spacing during the conveyance of the bottles from one machine to the other.

After being filled the bottles are guided off the supporting platforms 58 of the filling machine by the engagement of successive containers with an extended portion 60 of the guide plate 56 and are engaged by successive arms 62 of a continuously rotated spider or transfer member 64 arranged to transfer the bottles directly from the filling machine into the clamping jaws 66 of the rotary closure applying machine 14.

The closure applying machine 14 herein diagrammatically illustrated may and preferably will comprise a rotary machine of the type illustrated and described in the United States Patent to Everett, No. 2,082,048, issued June 1, 1937, to which reference may be had for a complete disclosure of the structure and mode of operation of such machine. In general, such machine is arranged to apply screw closures or caps to containers such as bottles and is provided with a plurality of successive clamping jaws 66 forming a part of a revolvable closure applying mechanism having a plurality of rotatable closure applying devices adapted to effect the application of the closure to the bottles held by the clamping jaws during the revolvable movement of both the clamping jaws and the closure applying devices.

In the illustrated embodiment of the invention, the closure applying machine is provided with four closure applying units spaced a distance apart different than the spacing of the bottles as they are being carried through the filling machine. For example, the spacing of the bottles in the filling machine is approximately six inches, and the pitch distance between the bottles in the capping machine is approximately eleven inches. Accordingly, the rotation of the transfer spider 64 and the pitch of the equally spaced arms 62 thereof is such as to receive the containers being discharged from the filling machine at an approximate six inch spacing and to deliver them to the closure applying machine at a spacing of approximately eleven inches and in timed relation to the operation of both machines. In operation, the bottles are carried around with the spider 64 between the latter and the cut out portion 68 of the guide plate 56 into a position where they are delivered to the clamping jaws 66 which have previously been opened to receive a bottle. In effect, the bottles are caused to travel at a faster rate of speed when they leave the filling machine in order to adapt their relation to the rotary speed and increased spacing of the bottles as they pass through the capping machine. Thus, the filled bottles are continuously moved in spaced relation from the filler to the capper without coming in contact with each other at any time, thus avoiding the excessive noise and breakage formerly encountered.

After being provided with a closure the filled and closed bottles are transferred from the closure applying machine 14 onto the continuously moving conveyer 20 by transfer arms 70 of a modified motion transfer mechanism, to be hereinafter more fully described, and which is arranged to remove the containers in timed relation to the operation of the capping machine and to slow down the movement of the containers as they are carried around with the transfer mechanism to deposit them upon the conveyer 20. Thus in effect the containers which are spaced approximately eleven inches apart in the capper and which are travelling at a relatively high speed, are deposited upon the conveyer 20 to provide a spacing of approximately six inches between containers and travelling at a relatively slower rate.

The containers deposited upon the continuously moving belt 20 are carried to the labeling machine 18, and, when the foremost container engages the star wheel 72 of the labeling machine, the succeeding containers are held back and are brought into contiguous relation by the continuously moving belt 20 thus forming a supply reservoir of containers for the labeling machine. The labeling machine, herein diagrammatically illustrated, may and preferably will comprise the labeling machine illustrated and described in the United States Patent No. 2,245,659 issued to A. C. Everett, June 17, 1941, to which reference may be had for a more complete disclosure of the structure and mode of operation of such labeling machines. In general such a labeling machine is adapted to simultaneously apply a plurality of labels to a plurality of containers, and includes an intermittently operated conveyer 74 adapted to convey the containers to and from intermittently operated label applying devices forming a part of a labeling machine. As herein shown and as further illustrated and described in said patent the labeling machine is provided with container feeding mechanism adapted to transfer the containers from the continuously moving supply conveyer 20 to the intermittently operated conveyer 74 in definite spaced relation for subsequent operations to be performed and to provide a continuous flow of containers in such spaced relation onto said intermittently operated conveyer.

Briefly, the operation of the illustrated labeling machine is as follows: the containers entering the machine upon the conveyer 20 are separated by the star wheel 72 in spaced relation to be received by the arms 76 of a continuously moving carrier or indexing mechanism indicated generally at 75. The continuously moving indexing device 75 is arranged to move the containers in definite spaced relation for subsequent labeling operations. It will be observed that the bottles are supported on a bridge plate 78 as they are advanced from the supply conveyer 20 to the intermittently operated conveyer 74. After being provided with a label, the bottles are guided from the intermittently operated conveyer 74 onto the conveyer 24 between diagonal guide rails 79. The bottles thus discharged from the labeling machine may be delivered from the conveyer 24 to subsequent machines in the line such as the banding machine 23 shown in Fig. 2A for applying a sealing band about the closure of each container and for performing other operations upon the containers or bottles, such machines being driven in timed relation to the operation of the labeling machine through common driving mechanism to be hereinafter described.

The banding machine, herein diagrammatically illustrated, may and preferably will comprise the banding machine illustrated and described in the United States Patent No. 2,103,302 issued to R. C. Strout, December 28, 1937, to which reference may be had for a more complete disclosure of the structure and mode of operation of such banding machines. In general, such a banding machine is adapted to apply a band or sleeve of wet regenerated cellulose over the top of the filled and capped bottles and onto the neck thereof in such a manner that when the band or sleeve dries it will shrink into tightly fitting relation upon the neck of the bottle covering at least a portion of the closure and forming a sealing member which must be destroyed or broken in order to open the bottle. As herein shown, the bottles delivered to the banding machine by the conveyer 24, are required to traverse a bridge plate 25 in order to be received on the intermittently operated conveyer 27 of the banding machine. As further illustrated and described in the Strout patent, provision is made for moving the bottle from the conveyer 27 to band applying position indicated at 29 and thereafter the bottles are transferred to the discharge conveyer 31 to be removed from the machine.

Figure 2:
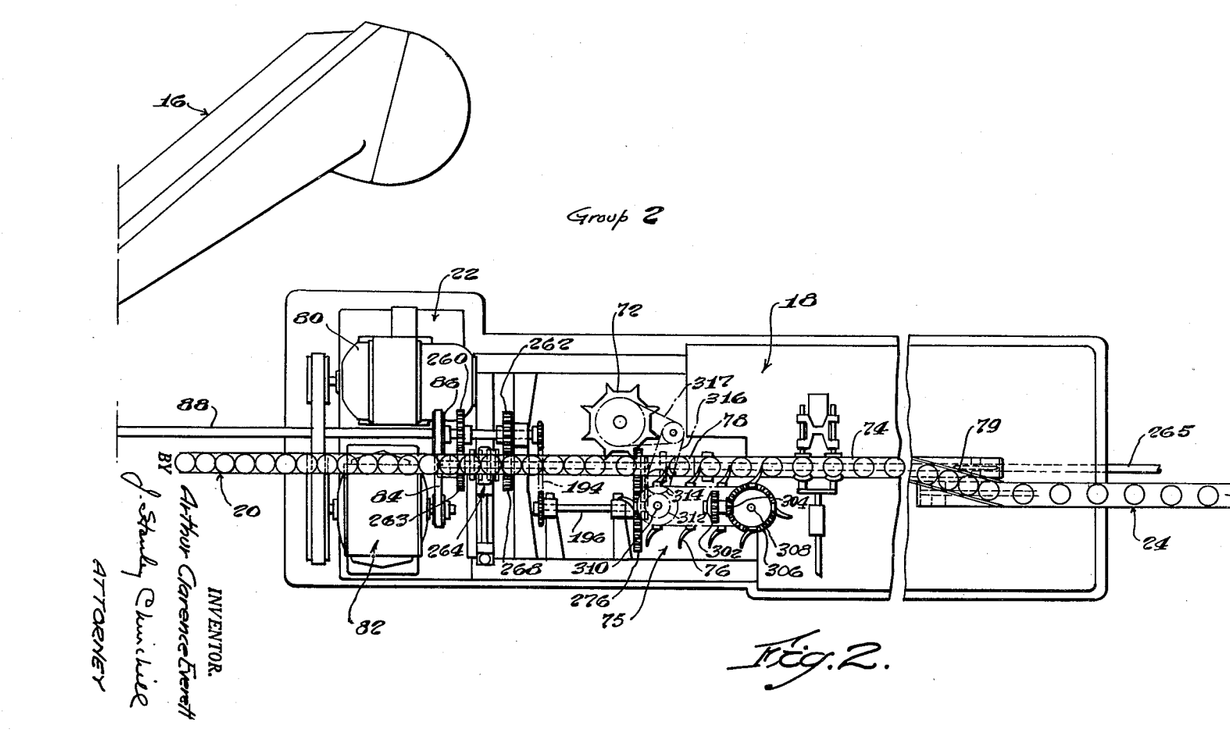
Fig. 2 is a continuation of Fig. 1 illustrating another portion of the apparatus.
Figure 3:
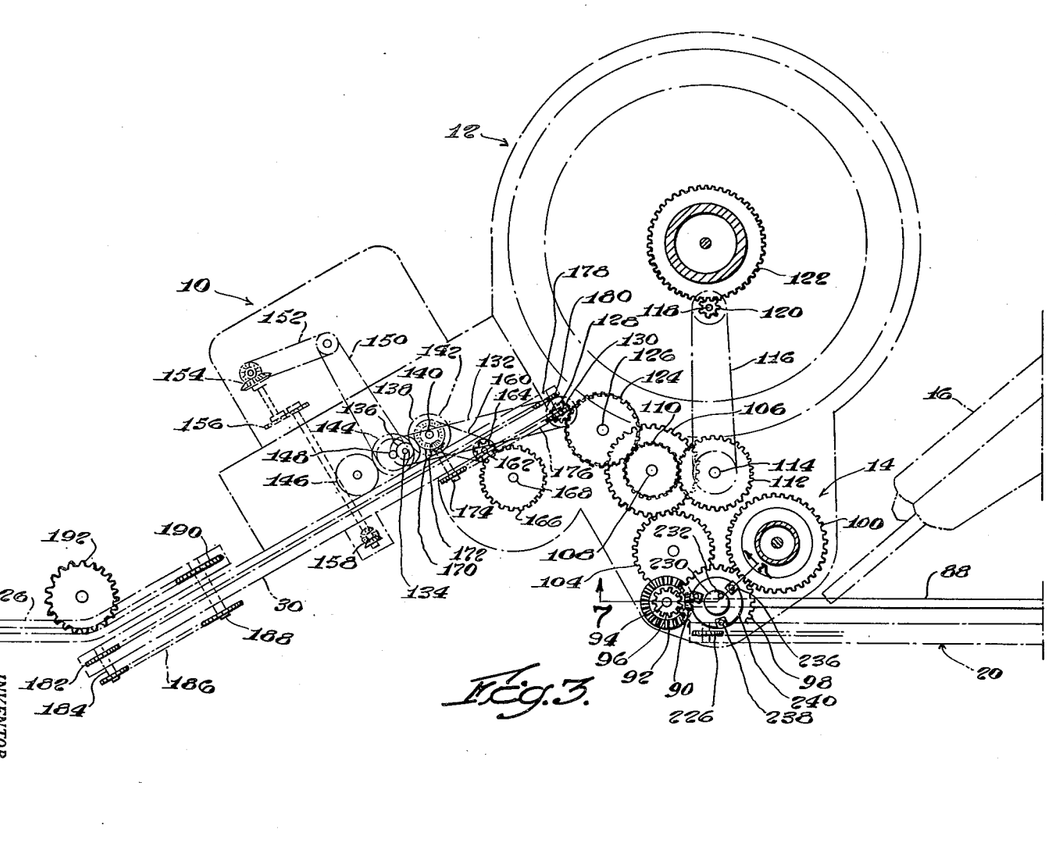
Fig. 3 is a plan view illustrating the driving mechanism for the portion of the apparatus shown in Fig. 1.
Figures 7, 8:
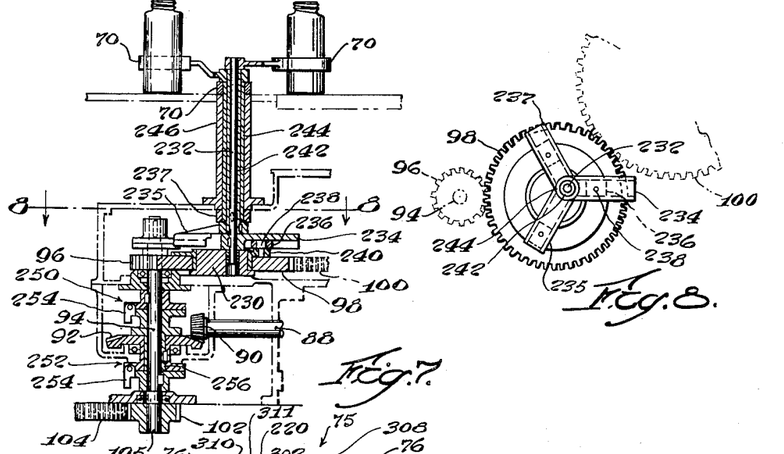

Referring now to Fig. 2 the main driving mechanism indicated generally at 22 includes an electric motor 80 belted to a variable speed device 82 which is in turn connected by a belt 84 to a pulley 86 fast on the main driving shaft 88 for driving the machines included in Group 1. As illustrated in Figs. 3 and 7, the shaft 88 is provided with a bevel gear 90 which meshes with a bevel gear 92 fast on a vertical shaft 94 rotatably supported in the machine frame. The closure applying machine indicated generally at 14 is driven through a gear train including a pinion 96 fast on the shaft 94 which cooperates with an intermediate gear 98 which in turn is arranged to mesh with a gear 100 forming a part of the closure applying machine and which corresponds to gear 424 shown in Fig. 3 of the drawings in the Everett closure applying machine Patent No. 2,082,048 above referred to, and by which the rotation of the machine and operation of the individual closure applying units is effected. Provision is also made for driving the bottle filling machine 12 from the vertical drive shaft 94 and as herein shown the lower end of the shaft 94 is provided with separable driving mechanism including a short shaft 105 in axial alignment with and detachably connected to the shaft 94, said shaft 105 having a pinion 102 which meshes with a gear 104 which in turn is arranged to drive a gear 106 fast on the lower end of a vertical shaft 108. The shaft 108 is also provided with a gear 110 cooperating with a gear 112 fast on a vertical shaft 114 upon which the rotary transfer member 64 is mounted. The shaft 114 is connected by a chain and sprocket drive 116 to a shaft 118 provided with a pinion 120 which cooperates with a gear 122 forming a part of the driving mechanism of the filling machine and which corresponds to the gear 60 shown in Fig. 4 of the drawings in the Everett filling machine Patent No. 2,136,421 above referred to and which is arranged to effect continuous rotation of the filling units and bottle supporting and elevating members therein disclosed.

The bottle cleaning machine 10 is also arranged to be driven from the gear 110 fast on the shaft 108 which is arranged to mesh with a gear 124 fast on a shaft 126 on which the rotary transfer member 52 is carried. The gear 124 cooperates with a pinion 128 fast on a shaft 130 which is connected by a chain and sprocket drive 132 to a vertical shaft 134 provided with a pinion 136 arranged to mesh with a gear 138 fast to a drive shaft 140 which corresponds to the shaft 306 shown in Fig. 3 of the drawings in the Everett cleaning machine Patent No. 2,354,308 above referred to, and which effects rotation of the discharge member 44 and the intake spider 36 of the cleaning machine 10 through a gear train 142, 144, 146 and also effects rotation of the cleaning spider as disclosed in said patent. As herein shown the star wheel 32 is driven from a shaft 148 on which the gear 144 is mounted through chain and sprocket drives 150, 152, bevelled gears 154, chain and sprocket drive 156, and through bevelled gears 158. Rotation of the transfer member 48 is effected through a chain and sprocket drive 160 from the shaft 140 to a shaft 162, the latter being provided with a pinion 164 arranged to mesh with a gear 166 fast on a vertical shaft 168 on which the continuously rotatable transfer member 48 is mounted.

The intake conveyer 30 and the supply conveyer 26 as herein shown are driven from the vertical drive shaft 140 through connections including bevel gears 170, 172 the latter being fast on a horizontal shaft 174 connected by a chain and sprocket drive 176 to the drive shaft 178 of the conveyer 30. The conveyer 30 may and preferably will comprise a metal chain link type of belt which runs over a driving sprocket 180 fast on the shaft 178 and an idler sprocket 182. The supply conveyer 26, as herein shown, is driven from the idler sprocket shaft 184 by a chain and sprocket drive 186 to a drive shaft 188 on which the drive sprocket 190 for the supply belt 26 is mounted. The supply belt 26 is guided into parallel relation to the angularly arranged intake belt by an idler sprocket 192, as illustrated.

From the description thus far it will be observed that the machines included in Group 1, comprising the cleaning machine 10, filling machine 12 and the capping machine 14, are continuously driven from the main driving mechanism 22 through the main driving shaft 88 in accurately timed relation to each other, and that the bottles are positively controlled and maintained in accurately spaced relation during their transfer from one machine to another and during their entire progress through the machines, thus being maintained out of contact and eliminating excessive noise and breakage. As above stated, the intermediate belt or equivalent type of conveyer 20 connecting the machines of Group 1 and Group 2 comprises a reservoir within which the bottles delivered from Group 1 may collect to enable the operator to introduce, inspect, or replace bottles at this point in their travel through the production line, the conveyer being continuously driven at a constant rate of speed. As herein shown, see Figs. 2, 4 and 6, the intermediate conveyer 20 is driven continuously and at a constant rate of speed from the main driving shaft 88 through connections including a chain and sprocket drive 194 to an intermediate shaft 196 which is in turn connected by a chain and sprocket drive 198 to a short shaft 200 which corresponds to the short shaft 46 shown in Fig. 2 of the drawings in the Everett labeling machine Patent No. 2,245,659, above referred to. The short shaft 200 is connected by bevel gears 202, 204 to a cross shaft 206 provided with a sprocket 208 fast thereon. The sprocket 208 is connected by a chain 210 to a sprocket 212 loosely mounted on a cross shaft 214 and the sprocket 212 has formed integrally therewith a second sprocket 216 which is connected by a chain 218 to a sprocket 220 fast on the conveyer drive shaft 222. The conveyer 20 may and preferably will comprise a metal link belt which runs over a drive sprocket 224 fast on the shaft 222 and over an idler sprocket 226 disposed at the other end of the conveyer, as shown in Fig. 3.

As above described, the modified motion transfer mechanism provided with the transfer arms 70 is arranged to transfer the bottles from the closure applying machine 14 onto the intermediate belt 20, and in practice, each transfer arm 70 is arranged to travel at a relatively fast rate of speed as it approaches a bottle to be removed from the closure applying machine in order to effect removal of the relatively fast moving and more widely spaced containers in the closure applying machine, and, the arm 70 is further arranged to increase in speed slightly during removal of the bottle from the open gripper or clamping arms 66 in order to avoid contact of the continuously moving gripper elements as they continue to rotate during the removal operation. Thereafter, during the transferring operation, the arm 70 is arranged to be gradually reduced in speed until the bottle is deposited upon the conveyer 20. The continuously moving conveyer 20 is preferably arranged to travel slightly faster than the speed of rotation of the arm 70 at this time, in order to advance the bottle out of the arm and to avoid contact of the end of the arm with the bottle during the continued rotation of the modified motion transfer mechanism.

The above described movement of the transfer arms 70 is effected through connections from the intermediate gear 98, as illustrated in Figs. 3, 7 and 8. As therein shown the gear 98 is mounted to rotate about a relatively large stationary hub member 230 attached to the machine frame. Within the stationary hub 230 is journalled a vertical shaft 232 arranged eccentrically with respect to the center of the hub which latter comprises the axis of rotation of the gear 98. The lower end of the shaft 232 is provided with a slotted arm 234 fast thereon and arranged to cooperate with a sliding block 236 carried by a pin 238 mounted fast in a flanged member 240 secured to and rotatable with the intermediate gear 98. The upper end of the shaft 232 is provided with one of the transfer arms 70 above described. The flanged member 240 is provided with three equally spaced pins 238 the other two of which are arranged to cooperate with similar slotted arms 235, 237 secured to an intermediate hollow shaft 242 and an outer hollow shaft 244 respectively. The hollow shafts 242, 244 are formed concentrically with the shaft 232 and are supported in a vertical bearing member 246 for relative rotation with respect to each other and each hollow shaft is provided at its upper end with an individual transfer arm 70. In the operation of the device it will be seen that due to the eccentricity of the shafts 232, 242, 244, which support the arms 70, with respect to the axis of rotation of the gear 98, the equally spaced pins on the gear 98, concentrically arranged with respect to said axis of rotation, are caused to effect sliding movement of the block 236 in the slotted arms 234, 235, 237 during rotation of the device. Thus, when a transfer arm 70 approaches a container to be removed from the capping machine the driving pin 238 is disposed relatively close to the center of the transfer arm shafts thus effecting a relatively fast movement of the transfer arm 70 at this time, and in the continued rotation of the device the driving pin 238 is moved further away from the center of said shafts thus effecting a relatively slower movement of the arm 70 as it approaches the conveyer 20 upon which the bottles are deposited. The bottles thus deposited upon the continuously moving conveyer 20 are carried to the labelling machine, as above described.

Figure 4:
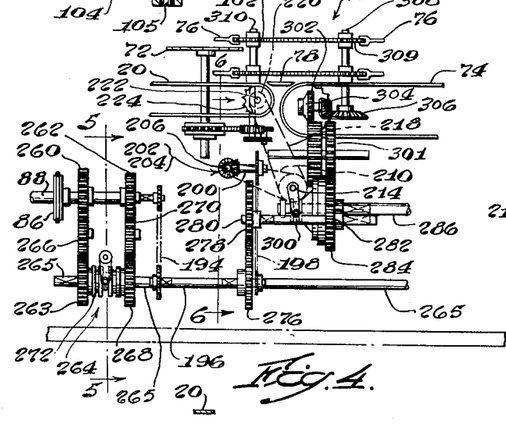
Fig. 4 is a front elevation of a portion of the driving mechanism shown in Fig. 2.
Figure 5:
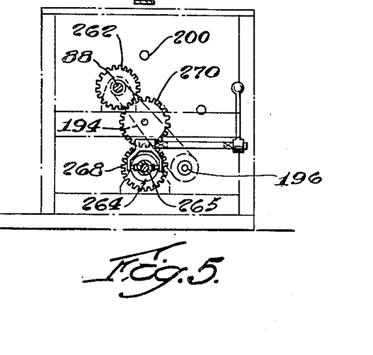
Figs. 5 and 6 are cross sectional views taken on the lines 5—5 and 6—6 respectively of Fig. 4.
Figure 6:
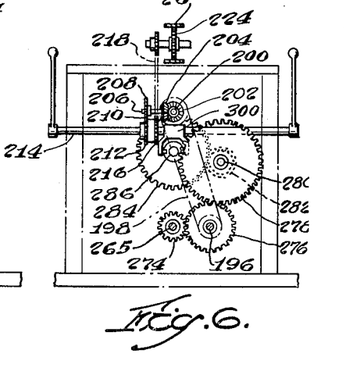

Provision is made for driving the labeling machine 18 and subsequent machines in Group 2 through connections from the main driving shaft 88 in timed relation to the operation of the machines of Group 1, and, when occasion requires, for speeding up the operation of the machines of Group 2 with respect to the machines of Group 1 in order to more rapidly deplete the bottles collected in the reservoir thus enabling the two groups of machines to be operated at the same speed or at different speeds with relation to one another. For this purpose, as illustrated in Figs. 4, 5 and 6 the driving connections between the main drive shaft 88 and the machines of Group 2 include two drive gears 260, 262 fast on the shaft 88 either one of which may be connected by a clutch 264 to perform the driving operation to a driving shaft 265 comprising the main driving shaft for the machines included in Group 2. As herein shown, the gear 260 is connected to a gear 263 loosely mounted on the drive shaft 265 through an intermediate gear 266 and the gear 262 is likewise connected to a gear 268 also loosely mounted on the driving shaft 265 through an intermediate gear 270. The gears 263 and 268 form the engageable members of the clutch 264 which are arranged to be engaged by a clutch member 272 fast on the drive shaft 265 and slidingly mounted thereon for engagement with either one or the other of the gears 263, 268. For normal operation, that is, to effect a speed of the machines of Group 2 in timed relation to the machines of Group 1, the train of gears 262, 270, 268 is engaged in driving relationship by the clutch 264, and, for effecting a faster speed of the machines of Group 2 with respect to the machines of Group 1, the gears 260, 266 and 263 are engaged in driving relationship. The main driving shaft 265 for Group 2 is provided with a pinion 274 arranged to mesh with a gear 276 loosely mounted on the intermediate shaft 196, the latter shaft serving as a pivot for the gear 276 of the train of gears for driving the labeling machine. The gear 276 is arranged to mesh with a large gear 278 rotatably mounted on an intermediate shaft 280 which is provided with a pinion 282 cooperating with a gear 284 loosely mounted on the cam shaft 286 of the labeling machine and arranged to be engaged in driving relationship therewith by a clutch shifter 380. The cam shaft 286 corresponds to the cam shaft 111 shown in Fig. 2 in the drawings of the labeling machine patent to Everett No. 2,245,659 above referred to.

As above stated, provision is made for accurately timing the introduction of the bottles about to enter the second group of machines and for this purpose the foremost bottles on the conveyer 20 are first arranged to engage the star wheel 72 by which the bottles are separated and thereafter the bottles are arranged in accurately spaced relation by the advancing fingers 76 of the indexing mechanism 75. As herein shown, and as more fully illustrated in said patent, the gear 284 is arranged to effect rotation of the indexing device 75 through a train of gears including spur gears 301, 302, bevel gears 304, 306, the latter being fast on the vertical shaft 308 upon which the sprockets 309 at one end of the registering mechanism are mounted. The chains carrying the registering fingers 76 run over sprockets 311 on a second shaft 310 at the other end of the registering mechanism and provision is made for rotating the star wheel 72 through connections from the lower end of the shaft 310 including spur gears 312, 314 and chain and sprocket drives 316, 317. The intermittently operated conveyer 74 is driven through connections from the drive shaft 265 as illustrated and described in the Everett Patent No. 2,245,659.

Figure 2A:
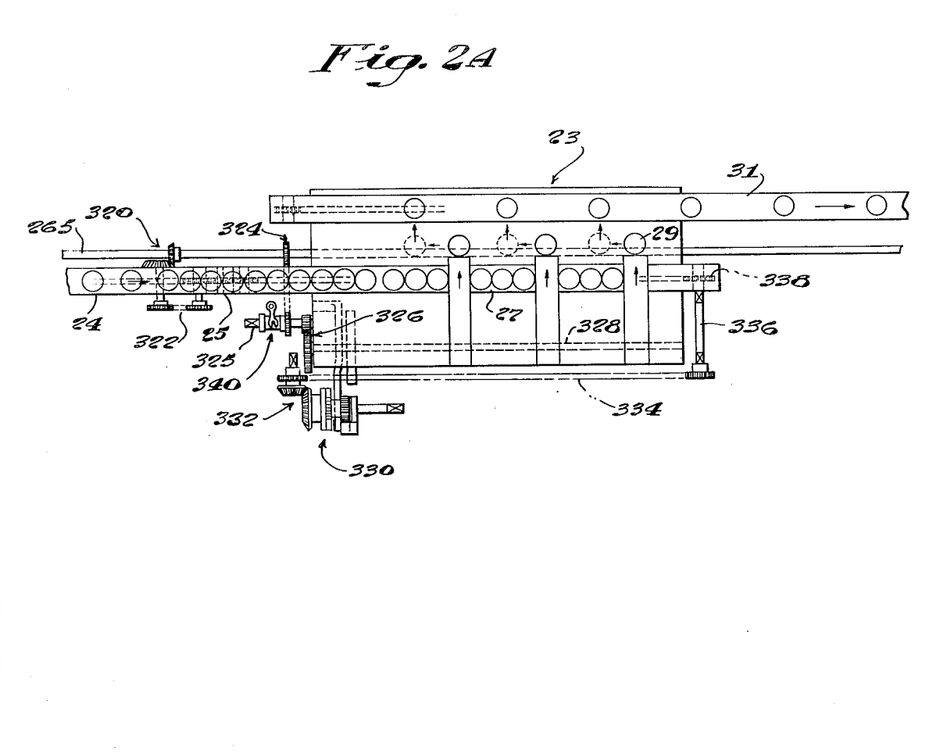
Fig. 2A is a continuation of Fig. 2 illustrating still another portion of the apparatus.

As illustrated in Figs. 2 and 2A the main drive shaft 265 for the machines of Group 2 extends beyond the labeling machine to which connections may be made for driving the bottle banding machine 23 in accurately timed relation to the labeling machine. As herein shown, the conveyer 24 may be continuously driven from the shaft 265 through connections including bevel gears 320 and chain and sprocket drives 322. The banding machine is driven from the shaft 265 by a chain and sprocket connection 324 which drives a short shaft 325 corresponding to the short drive shaft 8 shown in Fig. 3 of the drawings in the Strout Patent No. 2,103,302 above referred to. As herein shown and as further illustrated in the Strout Patent, the short drive shaft 325 is connected by spur gears 326 to the cam shaft 328 which corresponds to the cam shaft 16 shown in said patent. The conveyer 27 is arranged to be intermittently operated through connections from the cam shaft 328 including a cam operated rack and pinion drive indicated generally at 330, bevel gears 332, and a chain and sprocket drive 334, the latter being connected to a shaft 336 upon which the drive sprocket 338 for the intermittently operated link belt conveyer 27 is mounted. A clutch 340 may and preferably will be provided as a part of the driving connection between the shaft 265 and the drive shaft 325. In this manner the banding machine 23 is driven in timed relation to the operation of the labeling machine 18.

From the description thus far it will be observed that during the operation of the machine bottles disposed on the conveyer 20 may be removed at intervals for testing or other purposes. When a substantial number of such bottles have been removed and tested they may be replaced on the conveyer 20 to be received by and operated upon by the machines of Group 2, and, at times, it is desired to introduce filled and capped bottles from a previous run. At such time it may be found that the conveyer 20 is filled with bottles delivered from the machines of Group 1. Prior to the present invention it has been necessary to shut down the machines of Group 1 for a short time until the conveyer 20 has been sufficiently depleted of bottles to permit introduction of such additional bottles, thus losing production time. In the operation of the present apparatus, the clutch 264 may be shifted from the normally engaged driving connections 262, 270, 268 to the faster speed driving connections 260, 266, 263 to speed up the machines of Group 2 so as to more rapidly deplete the conveyer and thus provide space for such additional bottles without shutting down the machines of Group 1 thus permitting maximum production time to be maintained.

Provision is also made in the preferred embodiment of the apparatus for disconnecting the drives to the machines of Group 1, or, for permitting only selected machines of said group to continue in operation. As illustrated in Fig. 7 the vertical drive shaft 94 from which the closure applying machine and filling and cleaning machines are driven is provided with separable couplings indicated generally at 250 and 252 which include a movable latch member 254 arranged to be manually raised to disconnect the drive shaft 94 from either one or all of said machines. As herein shown the upper separable coupling 250 connects the shaft 94 to the train of gears for driving the capping machine and the lower separable coupling 252 connects the drive shaft 94 through a sleeve portion 256 of the coupling 250 and a second shaft 105 arranged in axial alignment with the shaft 94 to drive the train of gears connected to the filling and cleaning machines as clearly shown in Fig. 7. In this manner the capping machine may be permitted to continue in operation while the filling machine and the cleaning machine are idle, or conversely the cleaning and filling machines may be permitted to continue in operation while the capping machine is idle or, the drive to both machines may be disconnected, while permitting the conveyer 20 and the machines of Group 2 to continue in operation.

From the above description of the preferred and illustrated embodiment of the invention, it will be observed that from the time the containers enter the machines of Group 1 by being released into the cleaning machine 10 by the star wheel 32, the containers are engaged by positively moving fingers or their equivalent until they are discharged from the closure applying machine 14 onto the conveyer 20 whereby the continuously moving containers are positively controlled and maintained in spaced relation at all times during their progress through the machines of Group 1. Thus, successive containers entering the cleaning machine are positively engaged by the fingers 34 of the transfer mechanism 36 which effects disposition of the containers upon successive radially arranged platforms 38 of the cleaning machine. During the time the containers are being cleaned they are held between the platforms and individual radially arranged cleaning nozzles, as clearly shown in the Everett Patent No. 2,354,308 above referred to. Upon being cleaned, successive containers discharged from the machine are positively engaged by the fingers of the discharge spider 44, and during their transfer from the cleaning machine to the filling machine the containers are successively engaged by the rotary disc 48 and the intake spider 52. The intake spider 52 is arranged to dispose successive containers upon successive elevating platforms 58 of the filling machine in which the containers are positively controlled in their movement through the machine by the engagement of individual filling nozzles, as shown in the Everett Patent No. 2,136,421 above referred to. Thereupon the containers are discharged from the cleaning machine to be positively engaged by fingers 62 of the discharge and transfer spider 64, the latter being arranged to transfer successive containers into successive gripping jaws 66 of the capping machine 14 by which the movement of the containers is positively controlled during the capping operation. Finally, the filled and closed containers are individually discharged from the capping machine and transferred to the conveyer 20 by the transfer arms 70 thus completing the progress of the containers from the star wheel 32 to the conveyer 20 between which points the containers are positively controlled in their continuous movement in spaced relation through the machines of Group 1.

While the preferred embodiment of the invention has been herein illustrated and described, it will be understood that the invention may be embodied in other forms within the scope of the following claims.

Having thus described the invention, what is claimed is:

1. The combination with a plurality of mechanisms for performing successive operations on a container and constituting one group, means positively driving said mechanisms of said one group in accurately timed relation to one another, a plurality of different mechanisms for successively performing different operations on the container and constituting a second group, means positively driving said mechanisms of said second group in accurately timed relation to one another, a first conveying means comprising means for mechanically engaging and positively moving successive containers in accurately spaced relation into positions to be operated upon successively by the mechanisms of the first group, and for thereafter releasing said containers, a second conveying means for mechanically engaging and positively moving successive containers in accurately spaced relation into positions to be operated upon successively by at least one mechanism of the second group, and for thereafter releasing said containers, and intermediate transferring conveying means disposed between said groups of mechanisms for transferring containers as they are released from the first group into positions to be engaged by the second group, means for normally driving both groups of mechanisms and said conveying means in timed relation, means for varying the speed of said drive means, and means for varying the speed of said second group of mechanisms, said second conveying means and said intermediate transferring conveying means, relative to the speed of said first group of mechanisms and said first conveying means.

2. In a machine of the character described, in combination, a single driving means, variable speed means connected thereto, one group of mechanisms for performing successive operations upon a container, conveying means for engaging and positively conveying successive containers in accurately spaced relation through said first group of mechanisms, a second group of mechanisms for successively performing different operations upon the containers, a second conveyor for engaging and positively moving successive containers through said second group in accurately spaced relation, an intermediate transferring conveying means disposed between said groups for transferring containers from the first to the second group, driving connections between the variable speed means and the first-mentioned conveying means and the mechanisms of the first group, and between the variable speed means and the second conveyor, the intermediate conveying means, and the mechanisms of said second group for driving all of the mechanisms and conveyors in fixed speed relationship irrespective of variations in the speed thereof effected by adjustment of the variable speed means, said driving connections including change speed gearing operable for selectively driving the second group of mechanisms faster than the first group of mechanisms.

3. A container handling machine, comprising: a first mechanism for performing an operation upon successive containers; endless conveyor means for supporting and frictionally conveying the operated-on containers in upright position; a movable transfer mechanism for transferring successive upright containers from said first mechanism onto said conveyor means; a second mechanism arranged to successively perform another operation upon said upright containers while supported upon said conveyor means; indexing means for spacing said upright containers in predetermined spaced relation on said conveyor means, said conveyor means including a portion of substantial length between said first mechanism and said second mechanism serving as a readily accessible reservoir for containers to be supplied to said second mechanism and means for normally driving said transfer mechanism at a predetermined speed relative to the speed of said conveyor means and said indexing means, said drive means also including means for driving said conveyor means and said indexing means at a relatively higher speed than that of said transfer mechanism to clear said conveyor means.

4. A container handling machine, comprising: a capping device for applying caps upon successive containers; conveyor means for conveying capped containers in upright position; a transfer mechanism for transferring successive upright containers from said capping device onto said conveyor means; a labeling mechanism for applying labels to said containers while supported upon said conveyor means; indexing means for spacing said upright containers in predetermined spaced relation on said conveyor means, said conveyor means including a portion of substantial length between said capping device and said labeling mechanism and serving as a reservoir for containers to be supplied to said labeling mechanism and enabling manual inspection and/or removal or replacement of containers from said conveyor means prior to the application of labels to said containers by said labeling mechanism; and drive means for driving said labeling mechanism, conveyor means and said indexing means, and for driving said capping device and transfer mechanism at predetermined speeds relative to each other, said drive means including means for increasing the speed of the labeling mechanism, the conveyor means and the indexing means relative to the speed of the capping device and the transfer mechanism to clear said conveyor means.

5. A container handling machine as defined in claim 4, in which the conveying means includes a continuously driven belt conveyor which provides the reservoir for the containers, and an intermittently driven conveyor for moving the containers through the labeling mechanism.

6. A container handling machine as defined in claim 4, in which the transfer mechanism includes a rotatable arm, and in which the drive means for driving said transfer mechanism includes means for effecting rotation of said arm at a faster rate through one portion of a revolution than through the remainder of said revolution.

7. A container handling machine, comprising: a capping device for applying caps upon successive containers; conveyor means for conveying capped containers in upright position; a transfer mechanism for transferring successive upright containers from said capping device onto said conveyor means; a labeling mechanism for applying labels to said containers while supported upon said conveyor means; indexing means for spacing said upright containers in predetermined spaced relation on said conveyor means, said conveyor means including a portion of substantial length between said capping device and said labeling mechanism and serving as a reservoir for containers to be supplied to said labeling mechanism and enabling manual inspection and/or removal or replacement of containers from said conveyor means prior to the application of labels to said containers by said labeling mechanism; and drive means for driving said conveyor means and said indexing means, and for driving said transfer mechanism, said drive means including a gear train for driving said conveyor means and said indexing means at one speed relative to the speed of said transfer mechanism, another gear train for driving said conveyor means and said indexing means at a greater speed relative to the speed of said transfer mechanism to clear said conveyor means, and a clutch operable to selectively effect a drive through either of said gear trains.

ARTHUR CLARENCE EVERETT.

REFERENCES CITED

The following references are of record in the file of this patent:

UNITED STATES PATENTS

| Number | Name | Date |
|---|---|---|
| 707,737 | Warren | Aug. 26, 1902 |
| 955,551 | Reinsberg | Apr. 19, 1910 |
| 1,348,341 | Winkley | Aug. 3, 1920 |
| 1,643,990 | Malmquist | Oct. 4, 1927 |
| 1,860,720 | Norgaard | May 31, 1932 |
| 2,029,823 | Huntley et al. | Feb. 4, 1936 |
| 2,078,040 | Taylor | Apr. 20, 1937 |
| 2,103,158 | Kantor | Dec. 21, 1937 |
| 2,188,306 | Murch | Jan. 30, 1940 |
| 2,290,879 | Hothersall | July 28, 1942 |
| 2,353,523 | Stewart et al. | July 11, 1944 |
| 2,405,232 | Nordquist | Aug. 6, 1946 |